Patented July 30, 1935

2,009,951

UNITED STATES PATENT OFFICE 2,009,951

LIQUID COATING COMPOSITION

Jacob N. Wickert, Charleston, W. Va., assignor to Carbide and Carbon Chemicals Corporation, a corporation of New York No Drawing. Application December 21, 1933, Serial No. 703,413

14 Claims. (Cl. 134—79)

The invention relates to liquid coating compositions, such as lacquers, varnishes, enamels, and surface coatings in general. It has particular reference to a novel group of solvents for use with the usual lacquer and varnish components. Among the various types of well-known protective coating compositions are the lacquers employing as a basic constituent cellulose esters or other cellulose derivatives, varnishes prepared from natural resins mixed with vegetable or drying oils, and other coatings in which various synthetic resins are essential ingredients. In its broadest sense my invention is applicable to the preparation of all these different types of coatings.

I have found that esters of 2-ethylbutanol-1, formed by the reaction of this alcohol with carboxylic acids have excellent solvent powers for the cellulose derivatives and most of the gums, resins, and oils in common use as lacquer components. Both the aliphatic and aromatic monocarboxylic and polycarboxylic acid esters of the alcohol exhibit these solvent powers. They are characterized by such compounds as 2-ethylbutyl acetate, di-2-ethylbutyl phthalate, and di-2-ethylbutyl succinate.

The method of preparing the new solvents is disclosed in a Patent No. 1,972,579, granted to me on September 4, 1934, in which claim is made to them as new chemical compounds. Further extended tests on these esters show them to have physical and chemical characteristics especially adapting them for use in cellulose ester base lacquers, as well as others prepared from natural and synthetic gums and resins.

As a class, the esters of 2-ethylbutanol-1 are relatively high boiling solvents with comparatively slow evaporation rates. They are therefore effective in improving the flow of a lacquer of the usual spraying quality, and their ability to prevent and clear up a blush formation is also of value. In addition to chemical stability, and campatibility with practically all of the usual lacquer gums, oils, and resins, they also possess the many other properties so requisite to a solvent suitable for this purpose. The esters having a boiling point below about 300° C. at atmospheric pressure, or about 170° C. at 10 mm. pressure, function primarily as solvents in lacquer compositions, whereas those of higher boiling point, in addition to their solvent action, also serve as plasticizers and stabilizers in conjunction with both natural and synthetic resins.

Of the specific esters mentioned above, 2-ethylbutyl acetate is typical of one of the lower boiling ones, of use primarily for its solvent power only. This compound has a boiling point of about 160° C.–161° C. at atmospheric pressure, or about 70°–71° C. at 30 mm. pressure. Its comparative evaporation rate with other known solvents for similar uses classes it among the slower evaporating solvents, which are especially suitable in improving the flow of a spraying type lacquer. In compatibility with a large variety of gums, resins, and oils, it shows superiority over older solvents, which gives it a highly effective resistance to the formation of blush in a drying lacquer film. The solvent strength of this ester, its color, odor, chemical stability, and other properites, are all such as will clearly meet with the usual specification requirements of the lacquer manufacturer.

As examples of the higher boiling esters of 2-ethyl-butanol-1, di-2-ethylbutyl succinate, and di-2-ethylbutyl phthalate are typical. The succinic acid ester has a boiling point of about 183°–185° C. at 4 mm. pressure, whereas the phthalate boils at about 224°–226° C. at a similar pressure. In addition to being a solvent for lacquer bases, these compounds will also serve as plasticizers or stabilizers in a coating composition. With the exception of their boiling point and evaporation rate, the solvents have characteristics corresponding in many respects to those above shown as advantageous in the acetic acid ester. In compatibility, blush resisting properties, chemical stability, and other respects, they exhibit the qualities of importance to a suitable lacquer solvent.

The vehicle portion of a lacquer, which is commonly referred to as the "thinner", contains, as a rule, one or more volatile non-solvent diluents in addition to the actual solvent material. My new solvents have a high tolerance for diluents and the usual ones, such as toluol, xylol, benzene, and other hydrocarbon derivatives, can be mixed with them in the customary proportions. The actual proportion of solvent necessary in the thinner composition will vary with different lacquers, but can be easily determined by those skilled in the art. Mixing of one or more other solvents with those of my invention may also be appropriate for certain purpose, and the three specific esters here described may be used alone or in combination in formulating a suitable thinner composition.

As solvents for nitrocellulose, cellulose acetate, or other cellulose derivatives, the new esters are especially suitable, but their adaptability to lacquer compositions containing other basic ingredients will also be evident to those skilled in the art. The invention should not be limited other than as defined in the appended claims.

I claim:—

1. A composition of matter comprising a member of the group consisting of a cellulose derivative and a varnish gum or resin in a solution containing 2-ethylbutyl acetate.

2. A composition of matter comprising a member of the group consisting of a cellulose derivative and a varnish gum or resin in a solution containing di-2-ethylbutyl phthalate.

3. A composition of matter comprising a member of the group consisting of a cellulose derivative and a varnish gum or resin in a solution containing di-2-ethylbutyl succinate.

4. A composition of matter comprising a cellulose ester in a solution containing a carboxylic acid ester of 2-ethylbutanol-1.

5. A composition of matter comprising nitrocellulose in a solution containing a carboxylic acid ester of 2-ethylbutanol-1.

6. A composition of matter comprising a cellulose ester in a solution containing an aliphatic carboxylic acid ester of 2-ethylbutanol-1.

7. A composition of matter comprising a cellulose ester in a solution containing an aromatic carboxylic acid ester of 2-ethylbutanol-1.

8. A composition of matter comprising a cellulose ester in a solution containing 2-ethylbutyl acetate.

9. A composition of matter comprising a cellulose ester in a solution containing di-2-ethylbutyl phthalate.

10. A composition of matter comprising a cellulose ester in a solution containing di-2-ethylbutyl succinate.

11. A composition of matter comprising nitrocellulose in a solution containing di-2-ethylbutyl succinate.

12. A composition of matter comprising nitrocellulose in a solution containing 2-ethylbutyl acetate.

13. A composition of matter comprising nitrocellulose in a solution containing di-2-ethylbutyl phthalate.

14. A composition of matter comprising a member of the group consisting of a cellulose derivative and a varnish gum or resin in a solution containing a carboxylic acid ester of 2-ethylbutanol-1.

JACOB N. WICKERT.